(12) United States Patent
Pang

(10) Patent No.: US 12,326,981 B1
(45) Date of Patent: Jun. 10, 2025

(54) VISUALLY INDICATIVE KEYBOARD

(71) Applicant: Nianbin Pang, Shenzhen (CN)

(72) Inventor: Nianbin Pang, Shenzhen (CN)

( * ) Notice: Subject to any disclaimer, the term of this patent is extended or adjusted under 35 U.S.C. 154(b) by 0 days.

(21) Appl. No.: 18/659,010

(22) Filed: May 9, 2024

(30) Foreign Application Priority Data

Dec. 12, 2023 (CN) .......................... 202323389769.0

(51) Int. Cl.
   *G06F 3/02* (2006.01)
(52) U.S. Cl.
   CPC .................................. *G06F 3/0219* (2013.01)
(58) Field of Classification Search
   CPC ........ G06F 1/1669; G06F 3/02; G06F 3/0219; H01H 13/70–88
   See application file for complete search history.

(56) References Cited

U.S. PATENT DOCUMENTS

| | | | | |
|---|---|---|---|---|
| 2008/0266782 A1* | 10/2008 | Zhang | .................... | H01H 13/82 361/679.08 |
| 2011/0026997 A1* | 2/2011 | Bowen | .................. | G06F 3/0202 400/479 |
| 2021/0247850 A1* | 8/2021 | Norwalk | ................. | G06F 3/038 |
| 2023/0125225 A1* | 4/2023 | Chen | ...................... | H01H 13/83 345/168 |
| 2024/0393889 A1* | 11/2024 | Low | ...................... | G06F 3/0202 |

* cited by examiner

*Primary Examiner* — Priyank J Shah
(74) *Attorney, Agent, or Firm* — Li & Cai Intellectual Property Office

(57) ABSTRACT

A visually indicative keyboard, and it relates to the technical field of keyboards. It comprises: a key module comprising: a key main body, a key frame and an elastic support member; wherein the key frame is provided with a key hole, the key main body is provided on the key hole via the elastic support member, enabling the key main body to carry out upward and downward reciprocating movements relative to the key frame; a detection module, provided below the key module, wherein the detection module is provided with upwardly projecting sensing protrusions to sense the movement of the key main body; and a display module provided below the detection module. The sensing protrusions are provided in four groups corresponding to the four sides of the key main body respectively. The sensing protrusions correspond to a middle position on the side of the key main body.

9 Claims, 8 Drawing Sheets

VISUALLY INDICATIVE KEYBOARD

CROSS-REFERENCE TO RELATED PATENT APPLICATION

This application claims the benefit of priority to China Patent Application No. 202323389769.0, filed on Dec. 12, 2023, in the People's Republic of China. The entire content of the above identified application is incorporated herein by reference.

FIELD OF THE DISCLOSURE

The present disclosure relates to the technical field of keyboards, and specifically relates to a visually indicative keyboard.

BACKGROUND OF THE DISCLOSURE

A keyboard is a command and data entry device used to operate a computer equipment. It also refers to a set of functional keys that are systematically arranged to operate a machine or a device. A keyboard is the most commonly used and a main input device, through which English letters, Chinese characters, numbers, punctuation marks and so on can be entered into a computer, so as to send commands to the computer, input data and so on.

Nowadays, with the development of technology, a variety of different forms of keyboards have come into the picture. Among them, visually indicative keyboards have received greater attention due to their intuitive and vivid keystrokes, easy customization, and high playability. However, the current visually indicative keyboard is usually equipped with sensor protrusions on the elastic support member to cooperate with the detection module at the bottom to realize the key operation of the visually indicative keyboard. The process difficulty and production cost of setting sensing protrusions on the elastic support member are high, and it has a greater impact on the feel of the keys. Furthermore, prolonged use will lead to the detachment of the sensing protrusions, and can also lead to the malfunction of the visually indicative keyboard, affecting the stability and service life of the visually indicative keyboard and is therefore in urgent need of improvement.

SUMMARY OF THE DISCLOSURE

The goal of the present disclosure is to address the defects and deficiencies of the prior art, and to provide a visually indicative keyboard with the advantages of stability and good hand feel when the keys are pressed.

In order to achieve the above goal, the technical solution of the present disclosure is: a visually indicative keyboard, comprising:
  a key module comprising: a key main body, a key frame and an elastic support member; wherein said key frame is provided with a key hole, said key main body is provided on said key hole via said elastic support member, enabling said key main body to carry out upward and downward reciprocating movements relative to said key frame;
  a detection module, provided below said key module, wherein said detection module is provided with upwardly projecting sensing protrusions to sense the movement of said key main body; and
  a display module provided below said detection module.

Furthermore, said sensing protrusions are provided in four groups corresponding to the four sides of said key main body respectively.

Preferably, said sensing protrusions are aligned with a middle position on the side of said key main body.

Preferably, the lower side of said key main body or the lower side of said elastic support member is provided with sensing contact points corresponding to said sensing protrusions.

Preferably, a first air permeable groove for air permeability at the bottom of said key main body is provided at the lower side of said key frame, at the periphery of said key main hole.

Preferably, an air permeable plate is provided between said detection module and said display module, said detection module and said air permeable plate are both provided with openings corresponding to said key holes, and a second air permeable groove for the air permeability at the bottom of said key main body is provided on said air permeable plate, on the periphery of said opening.

Preferably, said second air permeable grooves are provided in two groups, one group being horizontally distributed and the other being vertically distributed.

Preferably, said key main body is made of transparent or translucent material.

Preferably, said detection module is electrically connected to said display module.

Preferably, said display module is a TFT display, an LCD display, an OLED display screen or an LED dot matrix module.

The beneficial effects of the present disclosure are:
  1. In the present disclosure, the visually indicative keyboard includes: a key module, a detection module and a display module. The detection module is provided below the key module, and the operation of the keyboard is realized by sensing the action of the key body through the sensing protrusions provided on the detection module. The sensing protrusions are provided on the detection module, which has a simpler production process and lower production costs. Meanwhile, the sensing protrusions can play a certain role in supporting the key main body to enhance the hand feel when the keys are pressed. The sensing protrusions are stationary when the keys are pressed, which means that the sensing protrusions are more stable and less prone to being damaged or falling off. The display module is provided below the detection module to visualize the keyboard, enabling the operation of the keyboard to be more intuitive and directive, and at the same time enhancing the degree of customization of the keyboard to increase the playability.
  2. In the present disclosure said sensing protrusions are provided in four groups corresponding to the middle positions of the four sides of said key main body respectively. When the key main body is pressed, any group of sensor protrusions will sense the movement of the key main body to realize the corresponding operation, which means that the key sensitivity of the keyboard is better. Meanwhile, the four groups of the sensing protrusions can realize good support for the key main body. When the key main body is pressed, the four groups of sensing protrusions allow the key main body to remain well balanced, improving the using experience of the visually indicative keyboard.
  3. In the present disclosure, a first air permeable groove is provided at the lower side of said key frame, at the periphery of said key main hole. The first air permeable groove serves for air permeability at the bottom of said key main body, so that when the key is pressed, it will not be difficult to be pressed down due to the influence of the internal air pressure, and when the key needs to move upward, it will not get stuck due to the internal air pressure and be difficult to move upward. This means that the upward and downward movement of the keys are ensured, which improves the hand feel of the keyboard during use. An air permeable plate is further provided with between said detection module and said display module. Said detection module and said air permeable plate are both provided with openings corresponding to said key holes. A second air permeable groove is provided on said air permeable plate, on the periphery of said openings, which further improves the air permeability at the bottom of said key main body. In addition, the air permeable plate can realize a good distribution of the pressure inflicted upon the keys during use, avoiding damage to the display module at the bottom of the keyboard when the keyboard is being used, and thus improving the durability of the keyboard.

BRIEF DESCRIPTION OF THE DRAWINGS

In order to more clearly illustrate the technical solutions in the embodiments of the present disclosure or in the prior art, the accompanying drawings used in describing the embodiments or prior art will be briefly described below. Obviously, the accompanying drawings in the following description are only some of the embodiments of the present disclosure, and other drawings may be obtained according to these drawings for those skilled in the art without creative work.

The reference signs in the figure are as follows: 1—key module, 2—detection module, 3—display module, 11—key main body, 12—key frame, 13—elastic support member, 111—key hole, 21—sensing protrusion, 112—first air permeable groove, 4—opening, 5—air permeable plate, 51—second air permeable groove, 6—housing, 61—anchor foot.

DETAILED DESCRIPTION OF THE EXEMPLARY EMBODIMENTS

The present disclosure is described in further detail below in conjunction with the accompanying drawings.

This specific embodiment is only an explanation of the present disclosure, but not a limitation of the present disclosure. The person skilled in the art, after reading this specification, can make modifications to this embodiment as needed without creative contribution, but as long as they are within the scope the claims of the present disclosure, they are protected by the patent law.

The present embodiment relates to a visually indicative keyboard, as shown in FIGS. 1-8, comprising: a key module 1, a detection module 2, and a display module 3.

Figure 3:
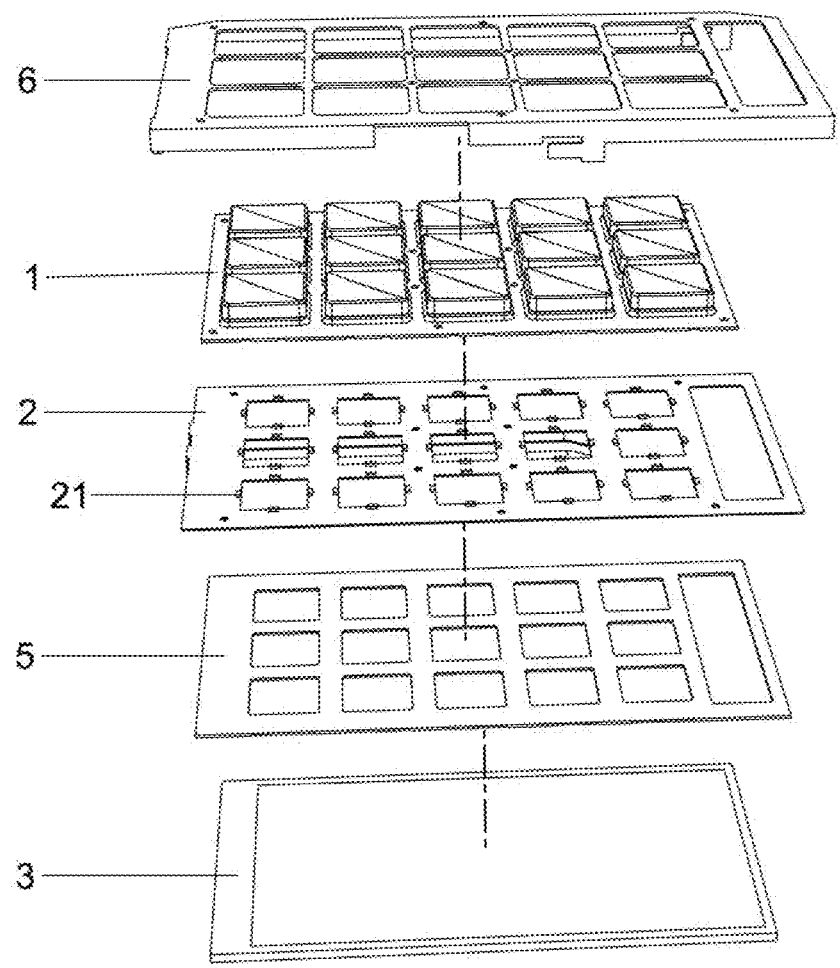
FIG. 3 is an exploded schematic diagram of the structure of the present disclosure.
Figure 4:
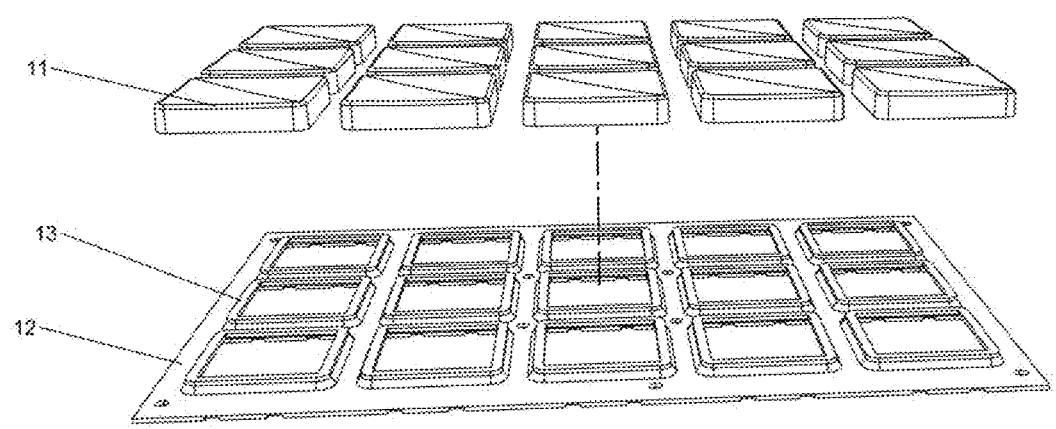
FIG. 4 is an exploded schematic diagram of the structure of the key module of the present disclosure.
Figure 5:
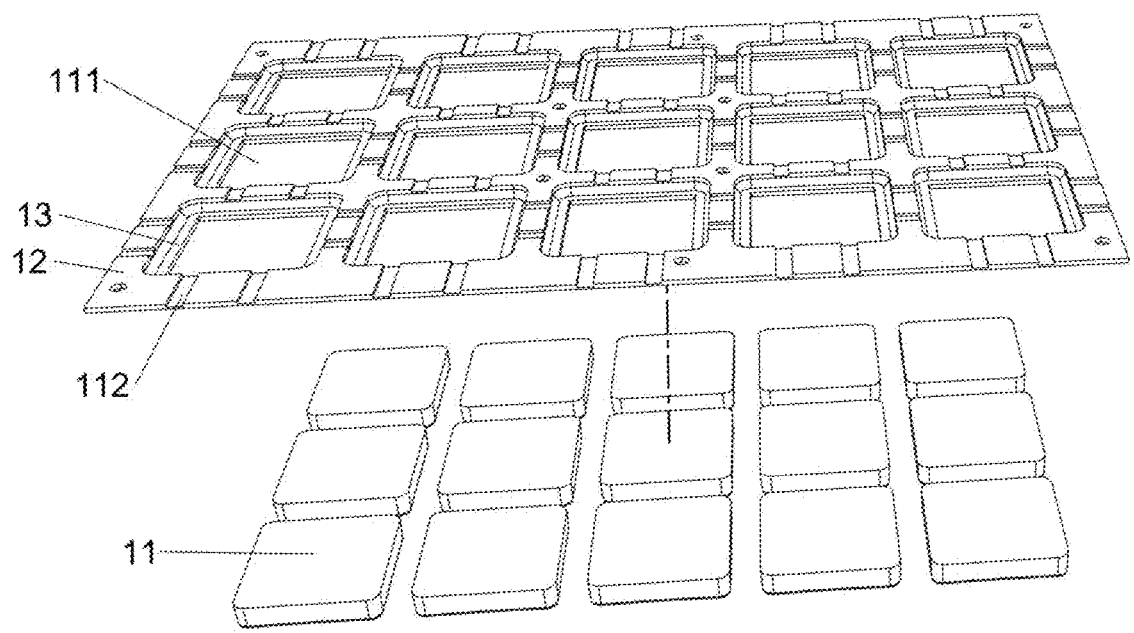
FIG. 5 is an exploded schematic diagram of another view of the structure of the key module of the present disclosure.

Therein, as shown in FIGS. 3-5, the key module 1 is provided in the uppermost layer of the keyboard, comprising: a key main body 11 for pressing operation, a key frame 12 for mounting the key main body 11, and an elastic support member 13. A key hole 111 is provided on the key frame 12 for the key main body 11 to press the key, and the key main body 11 is provided on top of the key hole 111 through the elastic support member 13, so that the key main body 11 can carry out upward and downward reciprocating movements relative to said key frame 12, in order to realize pressing of the key module 1 and the rebounding reset after pressing.

Figure 6:
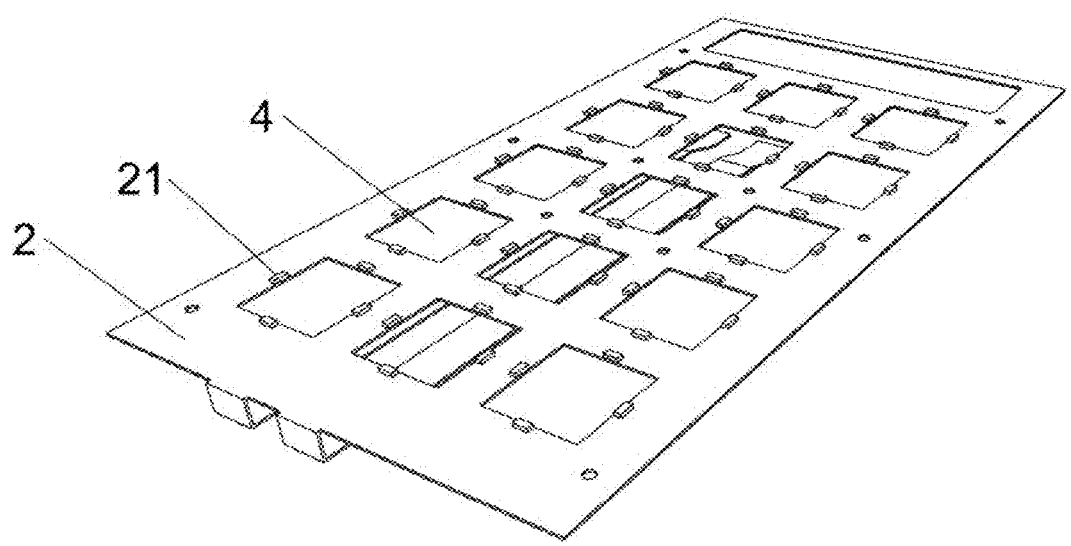
FIG. 6 is a schematic diagram of the structure of the detection module of the present disclosure.

As shown in FIGS. 3 and 6, the detection module 2 is provided below the key module 1 for sensing the action of the key main body 11 in the key module 1 in order to recognize the user's operation of the keyboard, and to realize a good key operation effect. Sensing protrusions 21 are provided on the detection module 2 corresponding to the key main bodies 11, and the sensing protrusion 21 is raised upwardly for sensing the action of the key main body 11 to recognize the operation of the keyboard. The sensing protrusion 21 is raised upward, and can play a certain supporting role on the key main body 11 when the key is pressed down to ensure the stable movement of the key main body 11 as well as a comfortable hand feel during use. The sensing protrusions 21 are set on the detection module 2, and the production process is simpler, which can effectively reduce the production cost of the keyboard. Meanwhile, because the detection module 2 is stationary during the use of the keyboard, the sensing protrusions 21 are more stable and can more effectively ensure stable operation of the keyboard. The sensing protrusions 21 are not easy to damage during use and are unlikely to have problems such as sensing failure and falloff, which improves the stability of the keyboard and ensures good use experience.

In the current embodiment, as shown in FIG. 6, sensing protrusions 21 are provided in four groups on the detection module 2 corresponding to the four sides of said key main body 11 respectively, in order to detect the four sides of the key main body 11. When the key main body 11 is pressed, the key main body 11 tilting to any side can be sensed by the corresponding sensing protrusion 21, which more accurately senses the movement of the key main body 11, ensuring the sensing accuracy of the detection module 2 and improves the use experience of the keyboard. In addition, in the event that one group of the sensing protrusions 21 is damaged and malfunctions, other sensing protrusions 21 are able to continue to function, which increases the service life of the keyboard. The four groups of sensing protrusions 21 correspond to the four sides of the key main body 11, and when the key main body 11 is pressed down, the four groups of sensing protrusions 21 can play a supporting role on all four sides of the key main body 11 to ensure the comfortable feel of the key main body 11 when pressed, and at the same time, to realize that the four sides of the key main body 11 support the balance. As a preferred technical solution, the sensing protrusions 21 are provided on the detection module 2, and each sensing protrusion corresponds to only one side of the key main body 11 and corresponds to the middle position of that side, in order to ensure the effect of the sensing the key main body and the effect of supporting the key main body 11. Of course, in other embodiments, each side of the key main body 11 can correspond to a plurality of sensing protrusions 21, and the sensing protrusions can be provided to correspond to other positions of that side.

As a preferred solution, the lower side of said key main body is provided with sensing contact points corresponding to said sensing protrusions 21, to enable the sensing protrusions 21 to better sense the movements of the key main body 11 to ensure effective operation of the keyboard. Of course, in other embodiments, sensing contact points can also be provided at the lower side of said elastic support member 13 to cooperate with the sensing protrusions 21 to realize a good sensing effect.

In this embodiment, as shown in FIG. 5, a first air permeable groove 112 is provided on the lower side of the key frame 12 and at the periphery of the key hole 111 to realize air-permeability at the bottom of the key body 11, which can avoid the formation of an airtight space between the bottom of the key and the detecting module 2 as well as the display module 3. This is to prevent the air at the bottom of the key body 11 from being unable to be discharged when the key body 11 is pressed down, which causes the key main body 11 to be more difficult to be pressed down, affecting the operating feel of the keyboard. At the same time, it avoids that after the key main body 11 is pressed down, air is not able to enter the bottom of the key main body 11 and the key body 11 is stuck and difficult to move upwards, which affects the rebounding reset of the key main body 11. The first air permeable groove 112 increases the air permeability of the bottom space of the key main body 11, ensuring the downward and upward movements of the key main body 11 free from the influence of the bottom space, effectively improving the hand feel of the keyboard and the stability of the operation. As a preferred embodiment, the first air permeable grooves 112 are provided in two groups. One group is horizontally distributed, and are provided on the left and right sides of the key holes 111 respectively. The other group is vertically distributed, and the grooves are provided on the front and back sides of the key holes 111 respectively, to realize air permeability from the four sides of the key holes 111 to the bottom of the key body 11, to ensure the keyboard's comfortable hand feel during use.

Figure 7:
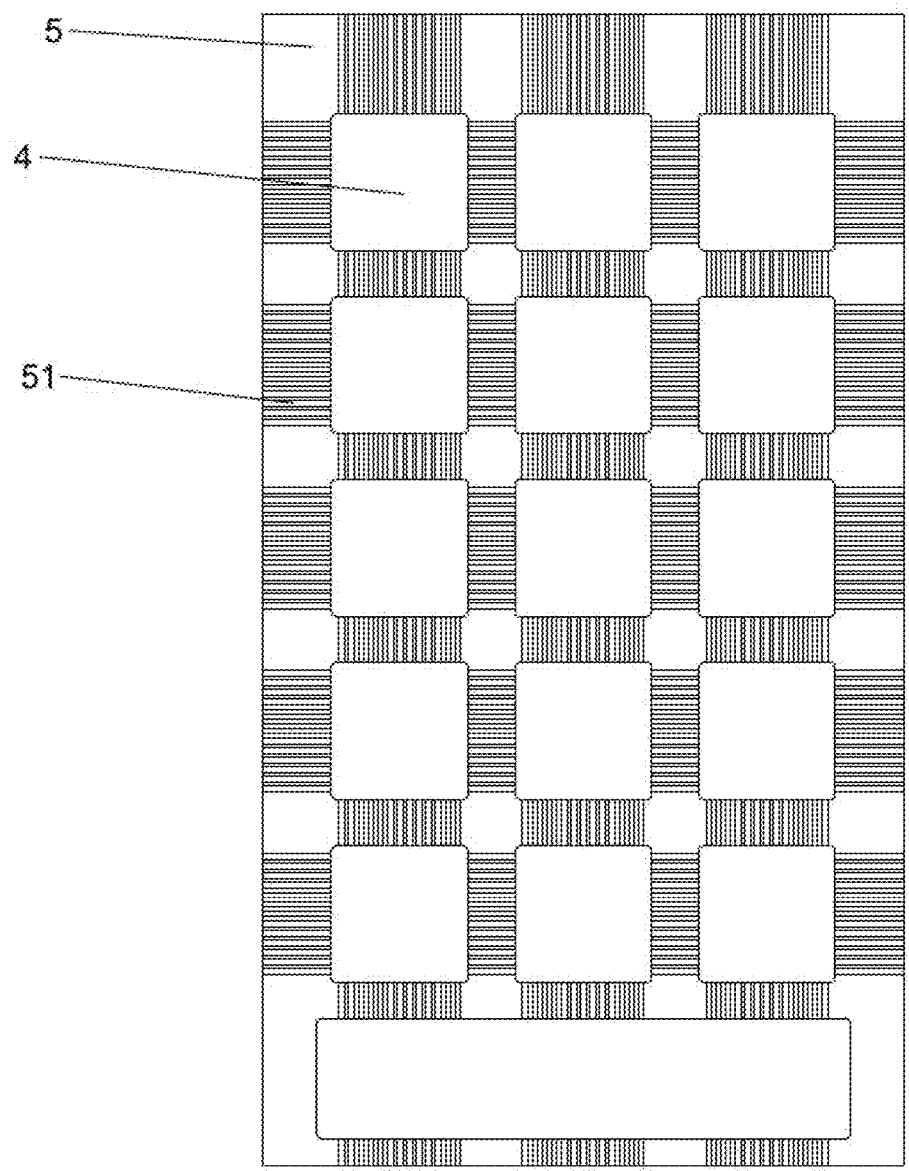
FIG. 7 is a schematic diagram of the structure of the air permeable plate of the present disclosure.

In this embodiment, as shown in FIGS. 3 and 7, an air permeable plate 5 is further provided between said detection module 2 and said display module 3. Said detection module 2 and said air permeable plate 5 are both provided with openings 4 corresponding to said key holes 111. A second air permeable grooves 51 are provided on the bottom of said air permeable plate 5, at the periphery of said opening 4, in order to further enhance the air permeability at the bottom of said key main body 11 and to ensure a comfortable hand feel during use of the keyboard. At the same time, when the key main body 11 is pressed, the air permeable plate 5 can effectively disperse the pressure inflicted by the key module 1 upon the display module 3 during use, bearing the influence and even damage of pressing the key main body 11 on the display effect of the display module 3 and the display module 3 itself. As a preferred embodiment, the second air permeability grooves 51 are provided in two groups, one group being horizontally distributed, and are located on the left and right sides of the openings 4 respectively, and the other group being vertically distributed, and are provided on the front and back sides of the openings 4 respectively, to achieve air permeability to the bottom of the key main body 11 from the periphery of the openings 4 so as to ensure the comfortable hand feel of the keyboard during use.

As a preferred embodiment, the key main body 11 is made of a transparent or semi-transparent material, so that the images displayed by the display module 3 can be observed through the key main body 11, through the key holes 111 and the openings 4, so as to realize the visual effect of the keyboard, which makes the operation of the keyboard more intuitive and directive. At the same time, this improves the degree of customization of the keyboard, and increases the playability of the keyboard as well as the aesthetics. Said display module 3 can either be a TFT display screen, an LCD display, an OLED display screen or an LED dot matrix module, in order to realize the visual effect of the keyboard.

Figure 1:
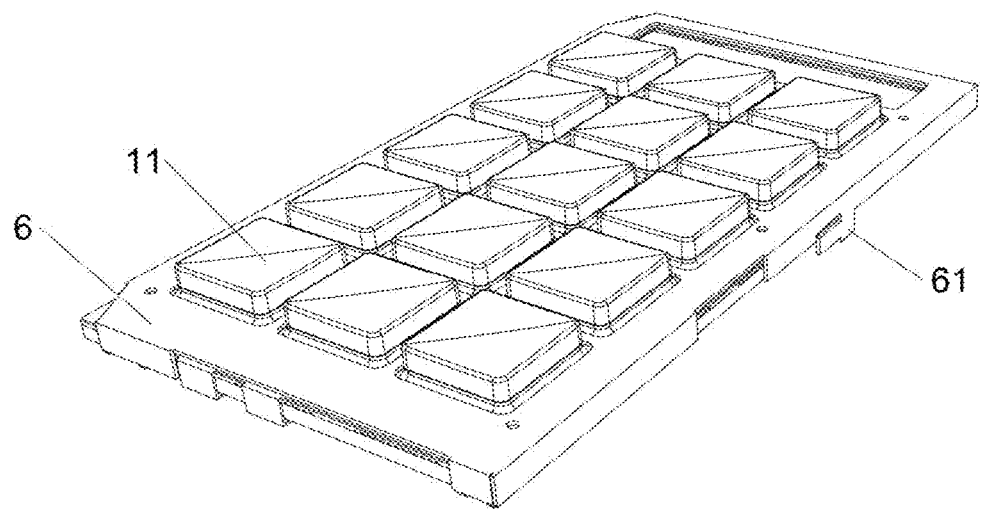
FIG. 1 is a schematic diagram of the structure of the present disclosure.
Figure 2:
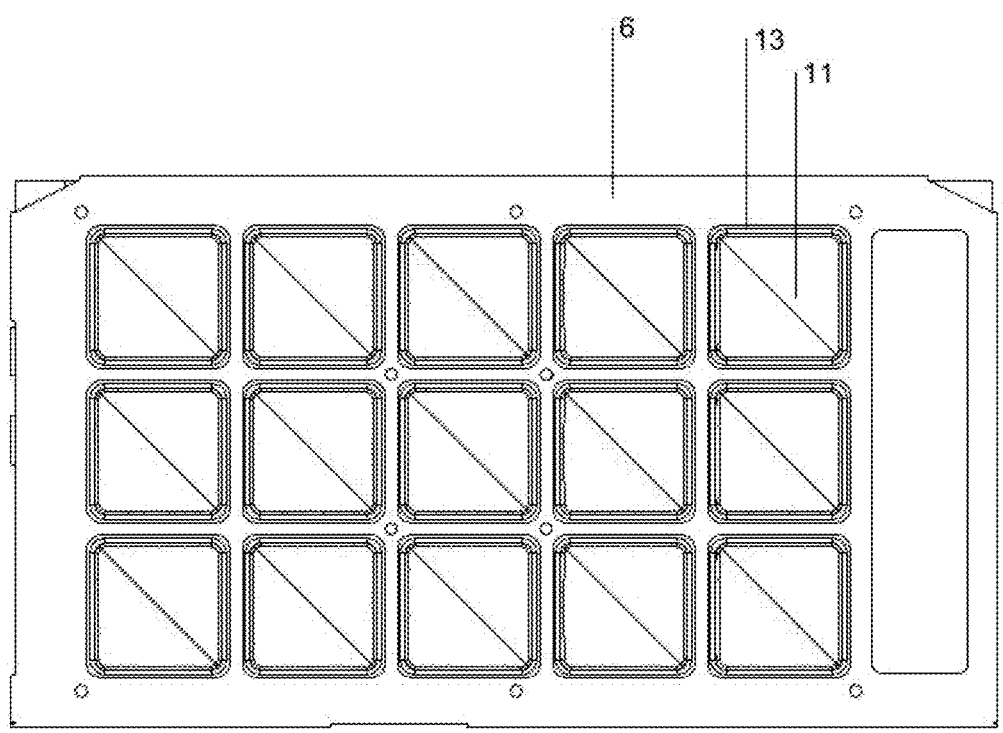
FIG. 2 is a schematic diagram of another view of the structure of the present disclosure.
Figure 8:
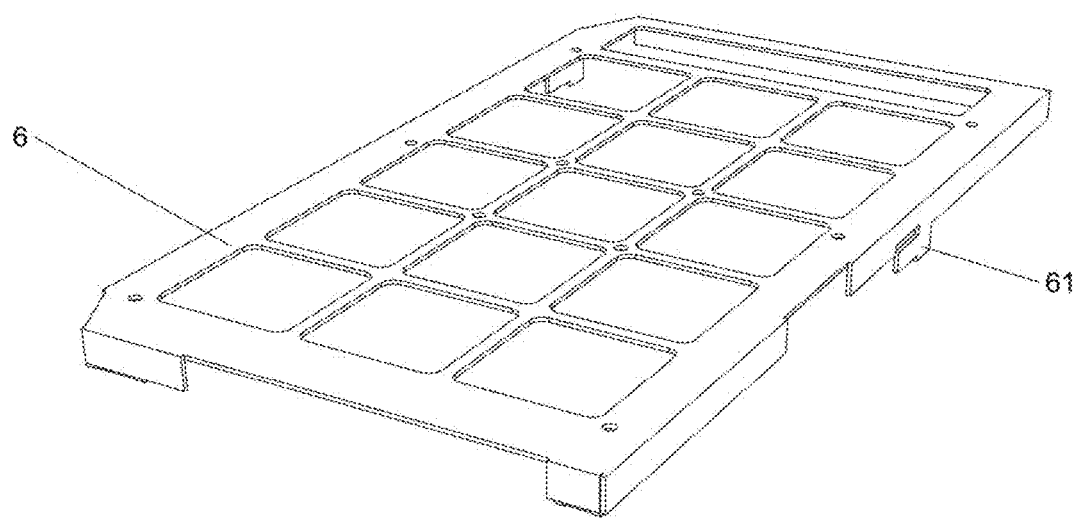
FIG. 8 is a schematic diagram of the structure of the housing of the present disclosure.

In this embodiment, as shown in FIGS. 1, 2, and 8, a housing 6 is also provided above the key module 1, which can play a protective role for the key module 1, and at the same time increase the texture of the keyboard and enhance the aesthetics of the keyboard. The peripheral sides of the housing 6 are provided with bendable anchor feet 61. The bendable anchor feet 61 are used to fix the various parts of the keyboard together, to ensure the stability of the keyboard structure, and at the same time, making it easy to dismantle the keyboard for maintenance. As a preferred embodiment, the detection module 2 is electrically connected to the display module 3, increasing the connection effect between the detection module 2 and the display module 3, forming a touch panel, and improving the use experience of the keyboard.

The above is only to illustrate the technical solutions of the present disclosure rather than limitations. Other modifications or equivalent substitutions made to the technical solutions of the present disclosure by people of ordinary skill in the art should be covered in the scope of the claims of the present disclosure as long as they do not depart from the spirit and scope of the technical solutions of the present disclosure.

What is claimed is:

1. A visually indicative keyboard, characterized in that it comprises:
    a key module (1) comprising: a key main body (11), a key frame (12) and an elastic support member (13); wherein said key frame (12) is provided with a key hole (111), said key main body (11) is provided on said key hole (111) via said elastic support member (13), enabling said key main body (11) to carry out upward and downward reciprocating movements relative to said key frame (12);
    a detection module (2), provided below said key module (1), wherein said detection module (2) is provided with upwardly projecting sensing protrusions (21) to sense the movement of said key main body (11); and
    a display module (3) provided below said detection module (2);
    wherein an air permeable plate (5) is further provided between said detection module (2) and said display module (3), said detection module (2) and said air permeable plate (5) are both provided with openings (4) corresponding to said key holes (111), and a second air permeable groove (51) for the air permeability at the bottom of said key main body (11) is provided on said air permeable plate (5), on the periphery of said opening (4).

2. The visually indicative keyboard according to claim 1, characterized in that said sensing protrusions (21) are provided in four groups corresponding to the four sides of said key main body (11) respectively.

3. The visually indicative keyboard according to claim 2, characterized in that said sensing protrusions (21) are aligned with a middle position on the side of said key main body (11).

4. The visually indicative keyboard according to claim 1, characterized in that the lower side of said key main body (11) or the lower side of said elastic support member (13) is provided with sensing contact points corresponding to said sensing protrusions (21).

5. The visually indicative keyboard according to claim 1, characterized in that a first air permeable groove (112) for air permeability at the bottom of said key main body (11) is provided at the lower side of said key frame (12), at the periphery of said key main hole (111).

6. The visually indicative keyboard according to claim 1, characterized in that said second air permeable grooves (51) are provided in two groups, one group being horizontally distributed and the other being vertically distributed.

7. The visually indicative keyboard according to claim 1, characterized in that said key main body (11) is made of transparent or translucent material.

8. The visually indicative keyboard according to claim 1, characterized in that said detection module (2) is electrically connected to said display module (3).

9. The visually indicative keyboard according to claim 1, characterized in that said display module (3) is a TFT display, an LCD display, an OLED display screen or an LED dot matrix module.

* * * * *